United States Patent [19]

Pioch

[11] 4,208,852
[45] Jun. 24, 1980

[54] PROCESS FOR THE ASEPTIC PACKING OF PRODUCTS AND MACHINE EMPLOYING SAID PROCESS

[75] Inventor: Michel M. R. Pioch, Saint Ramain de Colbosc, France

[73] Assignee: Pont-A-Mousson S.A., Nancy, France

[21] Appl. No.: 871,717

[22] Filed: Jan. 23, 1978

Related U.S. Application Data

[62] Division of Ser. No. 629,830, Nov. 7, 1975.

[30] Foreign Application Priority Data

Nov. 8, 1974 [FR] France .................................. 74 37155

[51] Int. Cl.² .......................... B65B 55/10; B65B 31/02
[52] U.S. Cl. ........................................... 53/167; 53/94; 53/561; 53/282; 141/243; 425/527; 425/535; 425/537
[58] Field of Search ................... 53/140, 167, 425, 426, 53/561, 86, 89, 94, 282; 141/243; 425/527, 535, 537

[56] References Cited

U.S. PATENT DOCUMENTS

| | | | |
|---|---|---|---|
| 3,526,186 | 9/1970 | Cornelius | 53/426 X |
| 3,566,575 | 3/1971 | Lisiecki | 53/426 |
| 3,643,586 | 2/1972 | Robinson | 53/86 X |
| 3,744,209 | 7/1973 | Conley et al. | 53/86 X |
| 3,747,296 | 7/1973 | Zausner | 53/167 |
| 3,809,768 | 5/1974 | Berry | 53/140 X |
| 3,911,640 | 10/1975 | Rausing | 53/167 X |
| 4,014,158 | 3/1977 | Rausing | 53/167 |

Primary Examiner—Travis S. McGehee
Attorney, Agent, or Firm—Sughrue, Rothwell, Mion, Zinn and Macpeak

[57] ABSTRACT

An aseptic packing machine comprising an enclosure defining a space swept through by a stream of sterile air and means for producing said stream of air. A station for producing containers, a filling station, a closing station and a transfer device cooperating with said stations are disposed inside the enclosure. The moving mechanical parts of said stations and said transfer device which are capable of being contaminating are located outside the part of said space which is maintained non-contaminating by said stream of sterile air.

15 Claims, 8 Drawing Figures

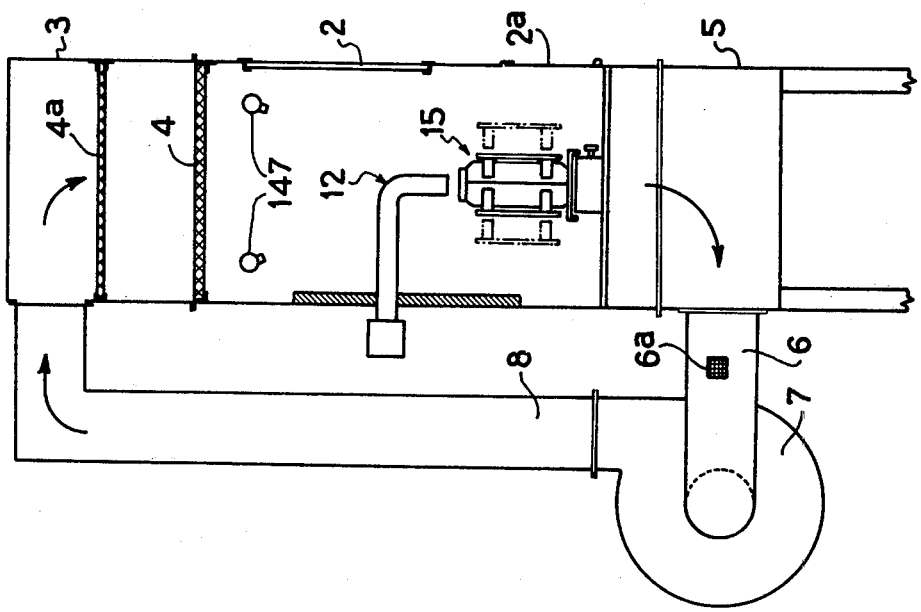
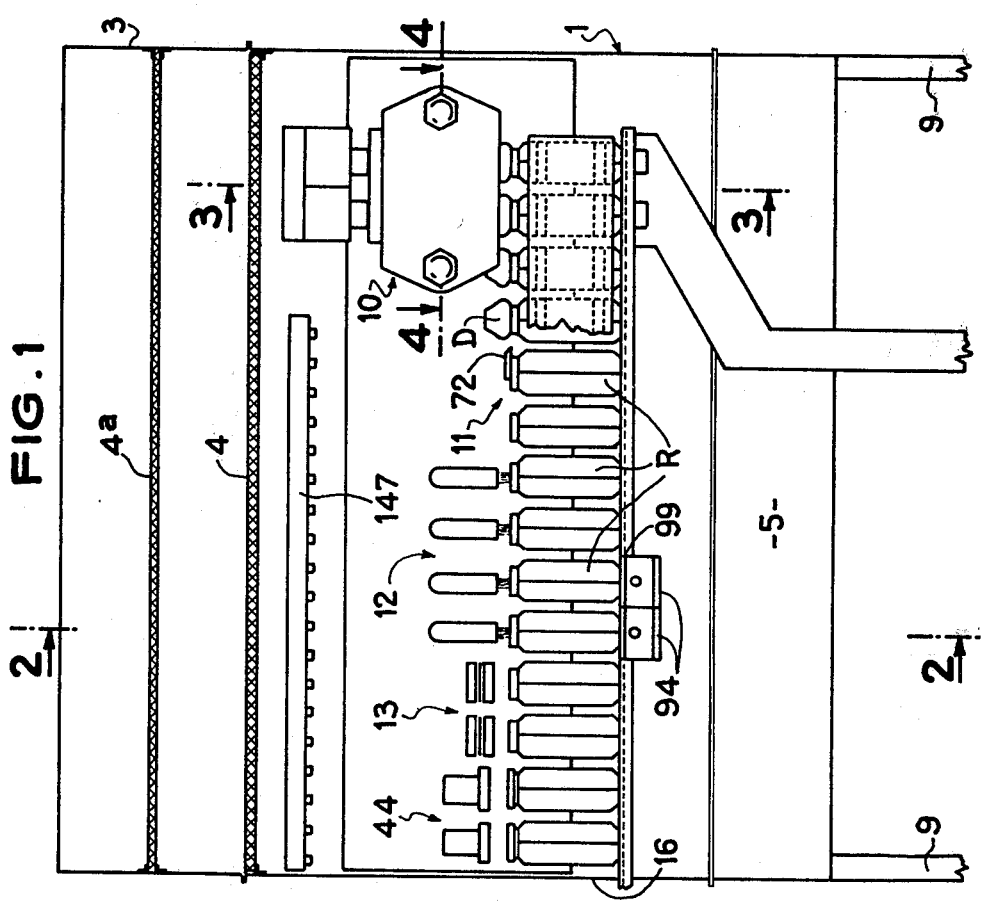

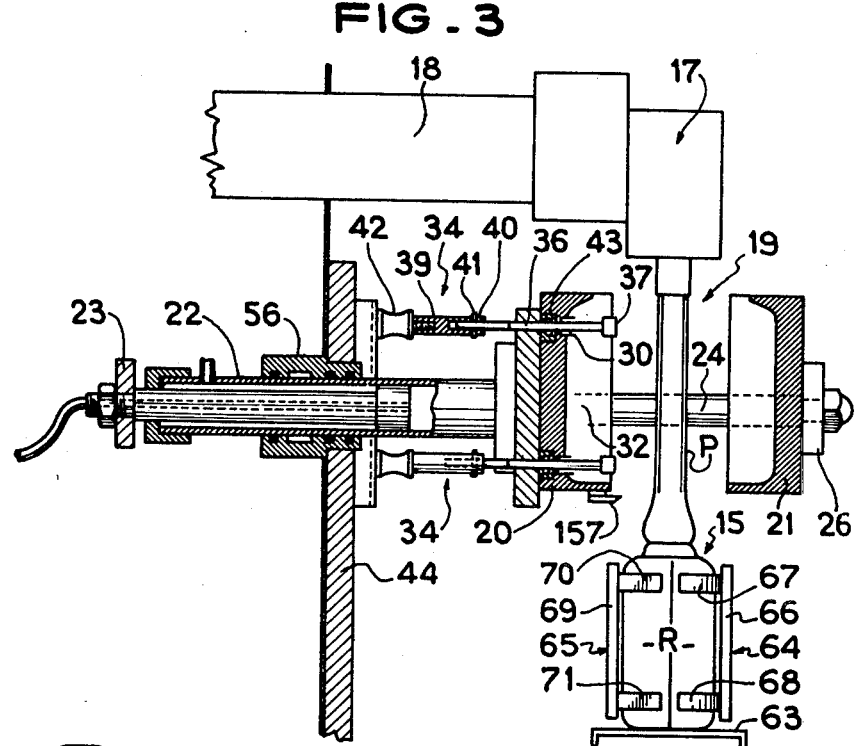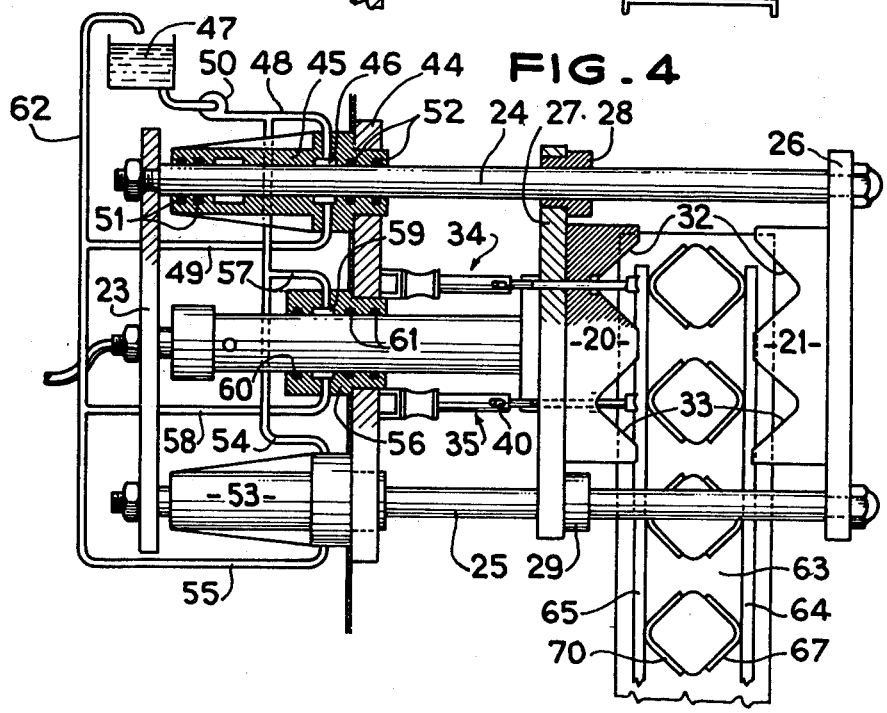

PROCESS FOR THE ASEPTIC PACKING OF PRODUCTS AND MACHINE EMPLOYING SAID PROCESS

This is a division of application Ser. No. 629,830, filed Nov. 7, 1975.

The present invention relates to the technique of the aseptic packing of products, such as food products and in particular dairy products, and more particularly relates to a process and a machine for the aseptic packing of the products of the aforementioned type.

In order to ensure the aseptic packing of a food product, such as milk, it is necessary to place the sterile product, and ensure its packing, in sterile containers.

For this purpose, everything must be done to maintain the different components of the contents—container assembly in the sterile state during the different packing stages.

Further, all the operations for cleaning and preparing the packing installation to automatically put it into the sterile state before undertaking the actual packing must be carried out.

Aseptic packing processes are known which comprise producing a container in a mould by extrusion and blowing and filling and closing this container inside the mould. This method has the drawback of being slow owing to the immobilisation of the mould in the course of the filling and closing operations.

Moreover, the method of closing the containers which consists in employing the material of which these containers are composed is not in common use since it is not approved by the consumers.

Another aspectic packing process consists in manufacturing internally sterile fluidtight containers in an extrusion and blowing machine and packing the product in the containers thus obtained inside a fluidtight enclosure which is pre-sterilized by the action of heat, the introduction of the containers in the enclosure being accompanied by an exterior sterilization.

The last-mentioned process is not very easy to carry out since it implies the use of a complex installation which takes a rather long time to start up and whose mechanisms undergo important stresses owing to variations of temperature due to the heat sterilization.

An object of the present invention is to overcome the aforementioned drawbacks and to provide a process and a machine for packing which are both simple, easy to use and rapidly started up while they ensure the required sterility of the packed products.

According to the invention, there is provided a process for aseptically packing a product and in particular a dairy product, said process comprising, at a first station, producing containers from a hot formable material, at a second station, filling the containers with the product to be packed, and at a third station, closing the containers hermetically, wherein all of the three stations and the transfer means are located in a space which is swept through by a stream of sterile air, a part of said space located at least upstream of the orifices of the containers being maintained non-contaminating by said stream of sterile air.

According to a particular feature of the invention, the air stream flowing through said space is a stream having a laminar flow.

Another object of the invention is to provide an aseptic packing machine for carrying out the process defined hereinbefore, said machine comprising an enclosure defining said space swept through by the sterile air stream, and means for producing said sterile air stream, and, disposed inside the enclosure, a station for producing the containers, a filling station, a closing station and a transfer device cooperative with said stations, the movable mechanical parts which are capable of being either located outside the stream of sterile air corresponding at least to the upstream side of the orifices of the containers or protected.

Further features and advantages of the invention will be apparent from the ensuing description with reference to the accompanying drawings given merely by way of example.

In the drawings:

FIG. 1 is a diagrammatic view of the packing machine according to the invention;

FIG. 2 is a sectional view taken on line 2—2 of FIG. 1;

FIG. 3 is a sectional view taken on line 3—3 of FIG. 1 showing the container producing station;

FIG. 4 is a plan view, partly in section, of the part of the machine shown in FIG. 3;

Figure 5:
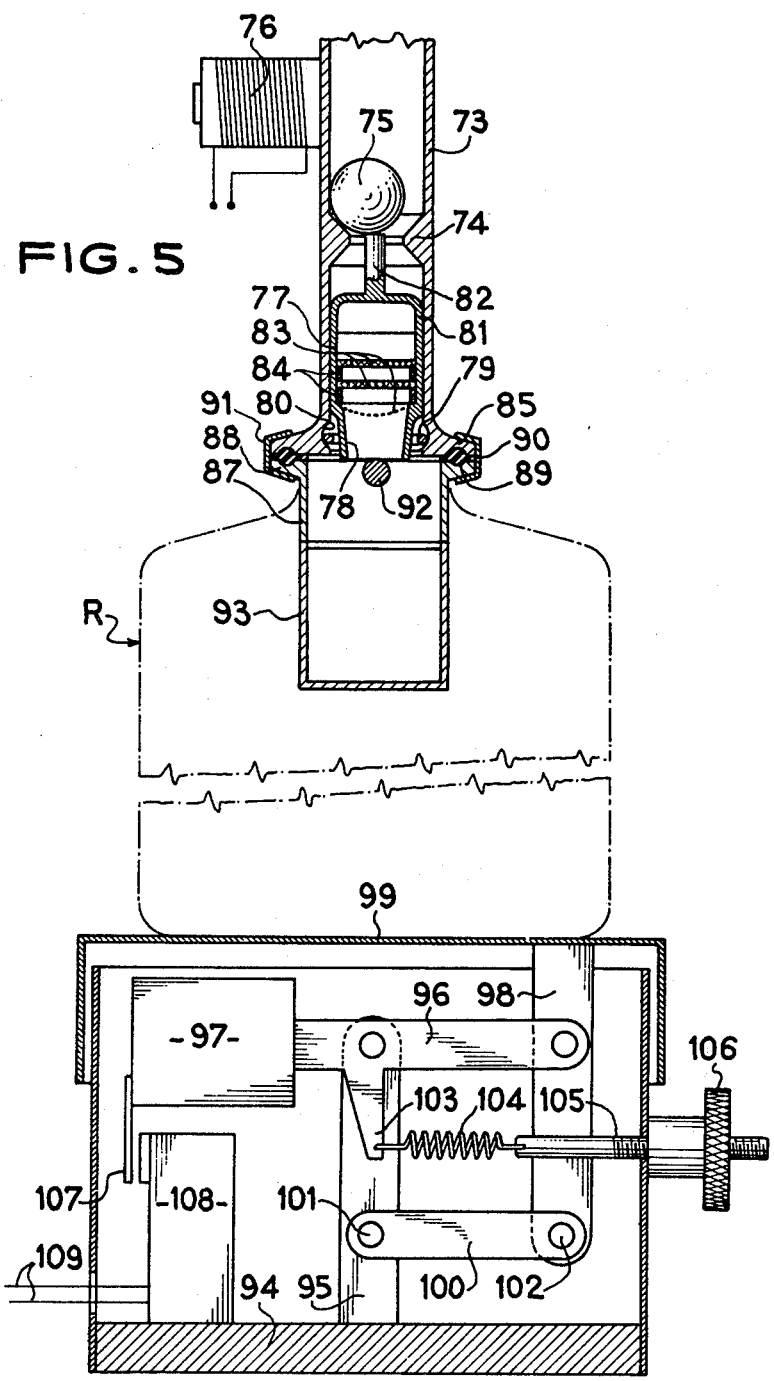
FIG. 5 is a sectional view of a weight metering unit which is part of the filling station of the machine.

In FIGS. 1 and 2 there is shown a machine for the aseptic packing of a product such as milk.

This machine comprises an enclosure 1 constituted by a metal frame in which there are mounted walls of the enclosure some of which, as the front wall 2, are constituted by window panes adapted to render the parts of the machine visible from the exterior. The wall 2 also has a door $2^a$ which allows access to the interior of the enclosure.

The enclosure 1 is surmounted by a first chamber 3 for distributing and admitting air into the enclosure. This chamber is provided with a filter 4 adapted to remove bacteria and other impurities contained in the air which must flow in the enclosure and with a pre-filter $4^a$ adapted to ensure a good distribution of the air over the filter 4.

For this purpose, there is advantageously employed a filter of high efficiency of the class 100 which allows through less than 100 particles of a diameter of less than $0.5\mu$ for a volume of air of 27 liters.

The enclosure 1 is mounted on a second chamber 5 for discharging the air which has swept through the enclosure, the chamber 5 being connected by way of a pipe 6 to a fan 7 which causes the circulation of the air. The pipe 6 is provided with an additional air inlet equipped with a pre-filter $6^a$.

The fan 7 is connected to the first chamber 2 by a pipe 8.

The chamber 5 is provided with feet 9 which support the machine assembly.

The enclosure 1 contains a station 10 for producing containers R, a neck cropping station 11, a filling station 12, a station 13 for presenting and applying a strip of material for closing the containers, and a station 14 for closing the containers. These various stations are cooperative with a linear transfer device 15 which is also disposed in the enclosure 1.

On the left side of the container closing station 14, the enclosure has an opening 16 for discharging the containers R, the dimensions of the opening 16 being slightly greater than those of the containers R so as to facilitate their discharge while reducing air losses.

The container producing station is shown in detail in FIGS. 3 and 4.

It comprises an extrusion-blowing head 17 carried by its duct 18 which extends through the rear wall of the enclosure 1. Below the extrusion-blowing head 17 there is disposed a mould 19 comprising two half-moulds 20, 21 which are movable symmetrically with respect to the joint plane of the mould by a jack 22 whose cylinder is secured to the half-mould 20 and whose piston rod is rendered integral with the half-mould 21 by a plate 23 which is outside the enclosure 1 and fixed to the end of the piston rod and to ends of two posts 24, 25 which extend through the enclosure and are fixed at their other ends to another plate 26 carrying the half-mould 21.

The posts 24 and 25 extend through a third plate 27 located inside the enclosure and interposed between the cylinder of the jack 22 and the half-mould 20 and are slidably mounted in the plate 27 by rings 28, 29.

In the illustrated embodiment, the half-moulds 20 and 21 each comprise two mould cavities 32, 33 which permit the production of two containers at a time. It will be understood that the number of mould cavities may be different, depending on the capacity of the machine.

The mould cavities 32, 33 have a square section. However, they may have any other shape.

The half-mould 20 is provided with two ejecting devices 24, 25 which are each associated with a mould cavity 32, 33. These devices, each of which is formed by two ejectors, are identical so that only one ejector, for example that of the device 34, will be described.

It comprises a rod 36 extending through the half-mould 20 and provided at its end with a head 37 capable of engaging in an aperture 38 provided in the end wall of the mould cavity 32. At its end opposed to the head 37, the rod 36 is slidably mounted in a member 39 provided with two oblong recesses 40 perpendicular to the direction of displacement of the rod 36, a transverse pin 41 fixed on the rod 36 being engaged in said recesses 40. The member 39 is fixed to the wall of the enclosure 1 by elastically yieldable means 42, such as a block of rubber.

The rod 36 is slidably mounted in half-mould 20 by a joint 43.

The ejector just described is mounted in the upper part of the half-mould whereas the other ejector of the device 34 is mounted in the lower part of the device.

The moving parts, such as the body of the cylinder of the jack 22 and the posts 24 and 25 which extend through the wall of the enclosure 1 have a part outside the enclosure 1.

In order to avoid contamination of its enclosure in the course of movements of the moving parts, the post 24 is slidably mounted in a plate 44, rendered integral with the wall of the enclosure, by a sealing device 45 forming a bearing which has a dry lubrication and provided with a recess 46 adapted to contain a bactericide liquid. The cavity 46 communicates with a tank 47 of bactericide liquid by way of pipes 48 and 49, a pump 50 being mounted in the pipe 48 between the tank 47 and the cavity 46.

Sealing joints 51 and 52 are provided at the two ends of the sealing device 45.

A sealing device 53 similar to the devices 45 is provided for the post 25 and is connected in parallel with the device 45 by pipes 54 and 55.

The body of the jack 22 is also mounted on the plate 44 by a sealing device 56 connected in parallel with the devices 46 and 53 by pipes 57 and 58 and provided with a cavity 59 supplied with a bactericide liquid by way of these pipes. Here again, sealing joints 60 and 61 are provided at the ends of the bores of the device 56 in which the body of the jack 22 is slidably mounted.

A common return pipe 62 returns the bactericide liquid to the tank 47.

As shown in particular in FIG. 3, the transfer device 15 is located in the presently-described embodiment below the container producing station 10.

The transfer device comprises a horizontal plate 63 whose width is slightly greater than the width of the containers R to be transported and whose axis of symmetry is in the joint plane of the mould 19. Mounted above the plate are two jaws 64, 65 which are movable in a reciprocating motion in front of the various stations of the machine, the movement of advance away from the mould 19 occurring with the jaws brought together and the return movement toward the mould 19 occurring with the jaws moved apart.

The jaw 64 is constituted by a flat bar 66 which carries on its side facing the jaw 65 two series of L-section members 67 and 68 which are secured at regular intervals to the plate at their corners.

The jaw 65 is also constituted by a flat bar 69 on which there are secured L-section members 70, 71 which are respectively in facing relation to the members 67, 68. The jaws 64 and 65 are actuated by a mechanism shown in FIG. 8 which is located for the major part below the plate 62.

Consequently, this mechanism, which is by construction contaminating owing to the fact that it has moving parts requiring lubrication, cannot contaminate the regions above the necks of the containers R since it is located in the air stream.

The neck cropping station 11 located in the path of the transfer device next to the container producing station 10, comprises a fixed cutter 72 adapted to crop off the scrap D of the necks of the containers R when the latter are driven by the transfer device 16 (FIG. 1).

Bearing in mind that the various apparatus forming part of the construction of the machine according to the invention must introduce minimum contamination in the enclosure 1 in the course of the packing operations, the filling station 12 which is located adjacent the cropping station 11 with respect to the direction of advance of the transfer device 15 is, for example, a ponderal or weight metering station.

In the embodiment shown in FIG. 1, the filling station comprises four filling devices associated, for the first two devices, with a metering device employing the counting of time and for the following two devices, with two platforms for effecting a weight metering. The filling devices are for example of the type described in French Patent No. 2,206,726 and the metering platforms are of the type described in French Pat. No. 2,098,780.

One of the units comprising a filling device and a metering platform is shown in FIG. 5.

The filling device comprises a tubular body 73 whose upper end is adapted to be connected to a constant-level tank (not shown) containing the sterilized liquid to be packed which is subjected to atmospheric pressure.

The constant-level tank is disposed outside the enclosure 1. The body 73 comprises a seat 74 adapted to cooperate with closing means constituted by a ball 75. This ball is adapted to be applied against the seat 74 by the force of gravity and by dynamic forces due to the flow of the liquid to be packed. The raising of the ball is controlled by an electromagnet 76 mounted in the body 73 and controlled electrically by the associated metering device. Slidably mounted at the lower end of the body 73 is a sleeve 77 extended by a spout 78 which normally extends out of the body.

The spout 78 has a frustoconical shape and its outer surface cooperates with an O-ring 79 disposed in a recess 80 provided at the lower end of the bore of the body 73. The section of the recess 80 exceeds the section of the ring 79 so as to allow it to move axially in the recess when the sleeve 77 moves.

At its end opposed to the spout 78, the sleeve 77 carries a yoke 81 which has a finger portion 82 adapted to urge the ball 75 upwardly. Inside the sleeve 77 there are mounted above the spout 78 baffles or screens 83 separated by spacer members 84.

The lower end of the body 73 is provided with a flange 85. A mechanical device for opening the filling device, employed in the course of the sterilization of the latter before starting up the installation, is adaptable to the flange 85.

The mechanical opening device comprises a tube section 87 provided, at the end thereof facing the flange 85 of the body 77, with a corresponding flange 88. A sealing element 90 is interposed between the two flanges 85 and 88 which are assembled in a sealed manner by a collar 91. A spout-raising rod 92 is mounted on a diameter of the tube section 87 at the level of the flange 88.

The end of the tube section 87 opposed to the flange 88 is connected to a manifold 93 supplying fluids for washing and sterilizing the filling device. The manifold 93 carries as many tube sections, such as section 87, as the filling station has filling devices and it is put in communication with the exterior of the enclosure 1.

The weight metering platform comprises a chassis 94 carrying two posts 95. A balance beam 96 is pivotably mounted on the posts 95. It carries a counterweight 97 at one end and at its opposite end it is pivoted between two parallel rods 98 integral with a plate 99 which is, as shown in FIG. 1, at the level of the plate 63 of the transfer device 16 of the machine.

Moreover, the rods 98 are connected to the posts 95 by an arm 100 which is pivoted to the posts 95 by a pin 101 and to the rods 98 by a pin 102 so as to form a deformable parallelogram structure comprising the balance beam 96, the posts 95 and the rods 98.

The balance beam 96 carries an arm 103 at the end of which there is fixed a tension spring 104 whose tension is adjustable by means of a screwthreaded rod 105 and a knurled nut 106.

The counterweight 97 carries a metal strip 110 which is movable in front of a proximity detector 108 which controls, through a conductor 109, the electromagnet coil 76 of the filling device.

It will be observed that the weight metering unit just described has practically no moving part subjected to the stream of air flowing through the enclosure above the necks of the containers. The moving parts which are part of the metering platform are located in the region of the enclosure 1 which is below the containers so that they cannot contaminate the region of the enclosure in which the filling operations are carried out.

Figure 7:
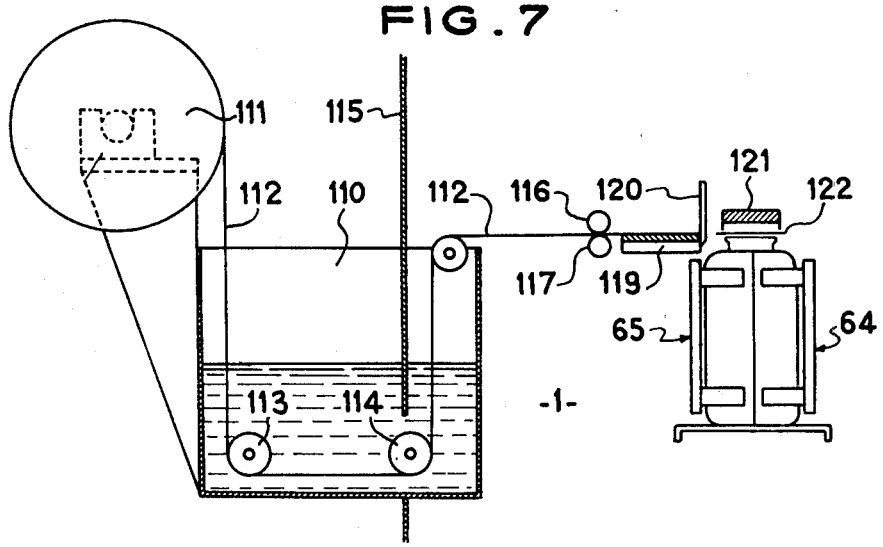
FIG. 7 is a diagrammatic view of the closing station of the machine.

The station 13 at which the strip or band for closing the containers is presented is shown in FIG. 7.

Such a station is for example of the type described in French Patent Application No. 74 37 023 filed on Nov. 8, 1974 by the Company SERAC S.A. The device of the aforementioned type comprises a tank 110 on which there is rotatably mounted a reel 111 which supplies a closing band 112 from which the closure members for closing the containers R are obtained. The band 112 is guided by rollers 113, 114 rotatably mounted in the tank 110 which contains a bactericide liquid and the band is driven by rollers 116, 117 mounted inside the enclosure 1.

The tank 110 is disposed in a position to form a hydraulic joint with respect to the wall 115 of the enclosure 1.

Downstream of the driving rollers 116, 117 there are disposed in the path of the band a plate 119 for guiding the band above the orifice of the containers R to be closed, and a cutter 120 whose operation is controlled by a suitable mechanism (not shown).

A heating iron 121 is provided for the thermal welding of the closure member 122 on the neck of the container R. It will be observed that apart from the heating iron 121, all the parts inside the enclosure 1 which are part of the device are located outside the part of the stream of air flowing through the enclosure defined by the neck of the container R. Consequently, these parts cannot contaminate the product in the container.

As concerns the heating iron 121, it is at a temperature high enough to guarantee that the sterility is maintained at the level of the neck of the container R.

Figure 6:
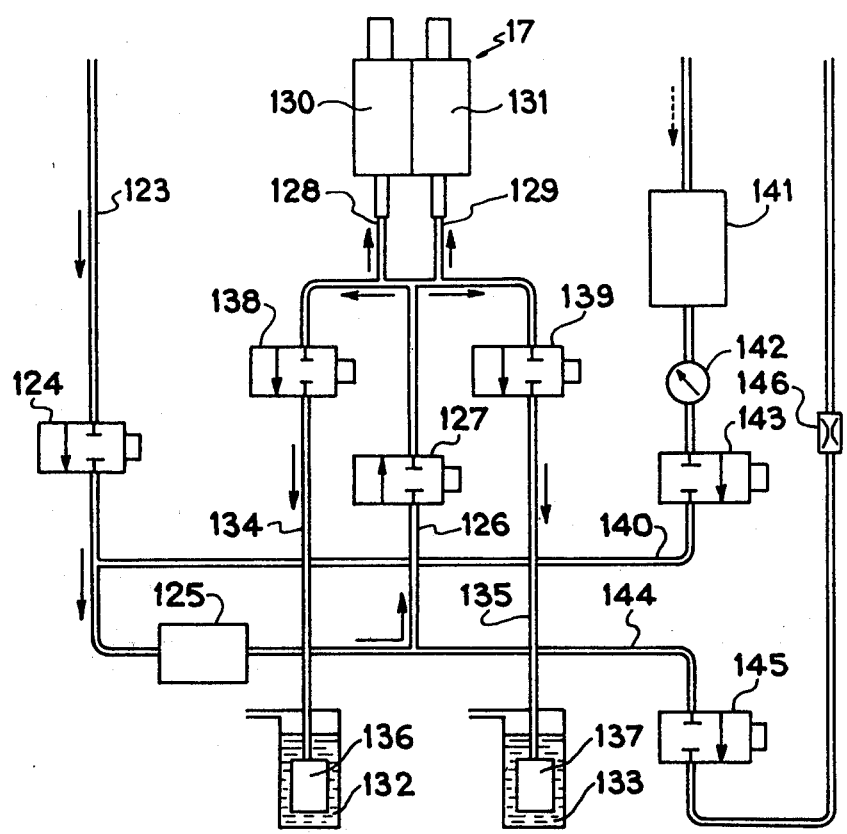
FIG. 6 is a diagram of the circuit supplying air for blowing the containers.

The circuit for supplying the blowing air for the containers shown in FIG. 6 comprises a compressed air supply pipe 123 for supplying compressed air to the double extrusion-blowing head 17 from a source of compressed air (not shown).

Mounted on the pipe 123 is an electromagnetically controlled valve 124 on the downstream side of which there is a filter 125. The pipe 123 is extended by a pipe 126 in which there is mounted a second electromagnetically controlled valve 127.

The pipe 126 is divided thereafter into two branches 128 and 129 which are respectively connected to the two parts 130 and 131 of the double extrusion-blowing head 17.

Two contamination detectors 132, 133 are respectively connected to the branches 128 and 129 through pipes 134 and 135. These detectors are constituted by containers containing a liquid responsive to impurities contained in the blowing air, a bubbling cartridge 136, 137 being connected to each one of the pipes 134 and 135 and extending into the liquid of the corresponding container 132, 133. Mounted on each of these pipes is an electromagnetically controlled valve 138, 139.

A pipe 140 supplying the circuit with sterilizing steam is connected to the pipe 133 between the valve 134 and the filter 135.

This pipe 140 is connected to a source of steam (not shown) and there are mounted thereon in series a steam filter 141, a pressure gauge 142 and an electromagnetically controlled valve 143.

At the junction point of the pipes 123 and 136 there is connected a pipe 144 for discharging the sterilizing steam, an electromagnetically controlled valve 145 and a throttle or constriction 146 being connected in series in the pipe 144.

With reference to FIG. 1, it will be observed that the machine is provided with systems 147 for spraying in the enclosure 1 a bactericide liquid intended to sterilize the enclosure and the various parts of the machine contained in the enclosure before putting the machine in operation.

Figure 8:
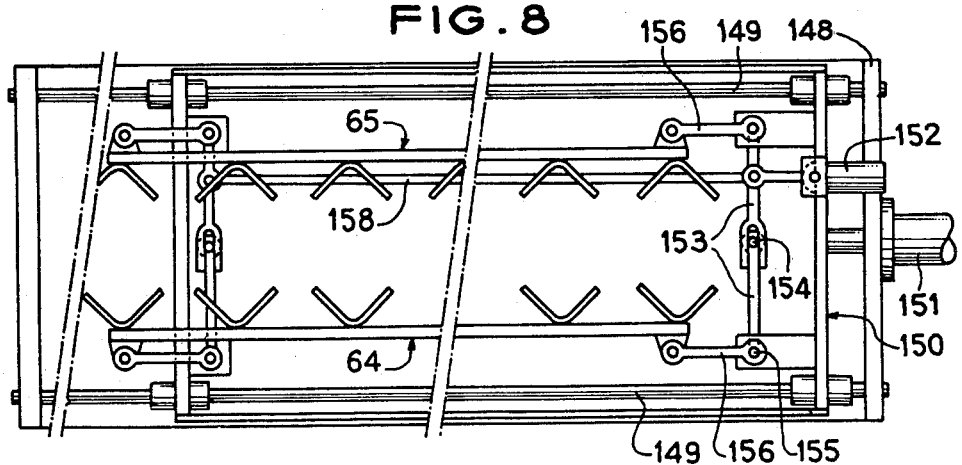
FIG. 8 is a diagrammatic view of the mechanism of the transfer device.

The mechanism of the transfer device illustrated in FIG. 8 comprises a fixed frame 148 on which there are fixed two parallel slideways 149 which act as supports for a movable chassis 150 whose movements are controlled by a jack 151.

The body of the jack is fixed to the frame 148 and its piston rod is integral with the chassis 150. The chassis 150 carries at one of its ends a second jack 152 adapted to control the movements of two links 153 of equal length which are interconnected at one of their ends by a pivotal connection 154 and each carry at its opposite end a shaft 155 which is journalled in bearings integral with the chassis 150. Each shaft 155 carries a second link 156 disposed at right angles with respect to the corresponding link 153. The free ends of the links 156 are pivoted to a jaw 64, 65 of the transfer device.

At the end thereof opposed to the jack 152, the chassis 150 carries a linkage identical to that actuated by the jack 152, the forces exerted by the latter being transmitted to the second linkage through a coupling bar 158.

The jack 152 is a jack having three positions which permit the jaws 64 and 65 to occupy a fully opened position, a pre-closing position in which the jaws 64 and 65 guide the containers R at their exit from the mould 19, and a closed position in which the jaws ensure the displacement of the containers on the plate 63.

The machine described hereinbefore operates in the following manner:

Before starting up the machine, a number of operations are carried out:
 washing and rinsing of the enclosure 1;
 sterilization of the filling circuit of station 12 of the machine;
 sterilization of the container blowing circuit;
 if need be, cleaning of the pre-filter of the inlet of additional air.

The washing and rinsing of the enclosure 1 are carried out by means of the bactericide liquid spraying systems 147. These operations can be carried out with a closed circuit having a tank for preparing cleaning solutions, a circulating pump, a draining pump and a pipe for returning the solutions to the tank.

The enclosure is rinsed with sterile water.

The filling station sterilizing circuit is advantageously part of the circuit for the preparation washing of the apparatus for receiving the sterile product to be packed.

The filling circuit is sterilized by passing a bactericide liquid through the filling devices, then rinsing with water and passing steam under pressure through the filling devices. For this purpose, the ball 78 is raised by raising the mechanical opening device to the position shown in FIG. 5. The rod 92 causes the sleeve 77 to rise and the finger portion 82 urges back the ball 75 and opens the filling device which is thus directly connected in a sealed manner with the manifold 93 connected to the exterior of the enclosure 1.

The blowing circuit is sterilized by causing high pressure steam (3 bars absolute pressure) to flow in the pressurized air supply circuit for the extrusion-blowing head. This operation is carried out in the following manner:

With the valves 124 and 127 normally closed, the valves 143 and 145 are opened. Consequently, the supply of compressed air to the extrusion-blowing head 17 does not occur; on the other hand, sterilizing steam is admitted in the compressed air supply circuit upstream of the valve 127.

It will be noticed that the part of the compressed air supply circuit downstream of the valve 127 does not receive sterilizing steam. This is not a drawback, since the extrusion-blowing head is at a temperature which is high enough to enable the material from which the containers are made to be extruded and inflated. This temperature is higher than the temperature of sterility so that the parts of the blowing circuit which are in the vicinity of the heads are also maintained sterile.

As the pairs of valves 124 and 127 and 143 and 145 are respectively closed and open, steam is injected into the pipe 140. This steam passes through the filter 141, cleans the air filter 135 and is discharged by way of the pipe 144 to the atmosphere through the constriction 146.

As the sterilization of the blowing circuit has finished, the valves 143, 145 may be returned to their initial positions.

Any necessary cleaning of the additional air intake pre-filter is effected from the exterior of the machine and does not present any particular problem.

The operations prior to the starting up of the machine having been effected, the enclosure 1 is supplied with a stream of air by starting up the fan 7. The air driven by the fan flows through the pipe 8, reaches the upper chamber 3, is distributed in the chamber by the pre-filter 4$^a$ and rendered sterile by the filter 4. The sterility of the air downstream of the filter 4 is given by the characteristics of the filter indicated hereinbefore.

The speed of rotation of the fan 7 is advantageously so adapted that at the outlet of the filter 4 the sterile air stream has a laminar flow (speed of air stream: 0.3 to 0.5 meter/second) so that the obstacles constituted by the parts of the machine inside the enclosure 1 produce a minimum of disturbance in the flow.

These parts, some of which, such as the extrusion-blowing head, the filling device and closing device, are located above the necks of the containers, are so arranged and shaped as to offer the least possible resistance to the flow of the air. For this purpose, as far as possible their contours are smooth and without asperities and their largest surfaces are parallel to the direction of flow.

The additional air intake provided with the prefilter 6$^a$ in the pipe 6 connecting the chamber 5 to the fan 7 permits compensating for losses of air in the course of its flow in the enclosure 1.

As the circulation of the sweeping air is established, the interior of the enclosure is permanently at a pressure slightly higher than atmospheric pressure so that there is no entry of air from the exterior. Moreover, as most of the parts of the machine placed above the orifices of the containers and practically above the plate 63 of the transfer device are rendered initially sterile by the aforementioned treatments, the flow of sterile air ensures the maintenance of the sterility of the region of the enclosure above the plate of the transfer device or upstream of this plate with reference to the direction of flow of the sweeping air.

The part of the machine below or downstream of the plate 63 has moving parts, such as for example the mechanism driving the transfer device and the mechanisms of the weight metering platform which require lubrication and are consequently contaminating. However, this contamination cannot rise in the stream of sweeping air so that the packing operations which are carried out in the region of the enclosure located above the plate 63 are carried out with no risk of alteration of the product to be packed.

The stream of sweeping air having been established in the enclosure 1, the containers R are produced.

With the mould 18 open (FIG. 2), two blanks P are extruded between the half-moulds 20, 21 and are enclosed, when the mould is closed, each one in a mould cavity 32 and 33. Then blowing air is supplied to the head 17. This operation is achieved by opening the valves 124 and 127 of the circuit shown in FIG. 6. The other valves of this circuit are maintained in their illustrated position. The compressed air entering the blank contained in each mould cavity 32, 33 causes the blank to marry up with or conform to the shape of the mould cavity.

The container thus formed is thereafter subjected to an operation for removing gas.

For this purpose, the valves 127 and 124 are closed and the valves 138 and 139 are opened so as to put the interior of the formed containers in communication with the contamination detectors 132 and 133. The blowing gas bubbles in the reactive liquid which is in each of the detectors and thereafter escapes by way of vents provided in the upper part of the detectors.

If the characteristics of the liquid contained in the detectors 132 and 133 are not modified by the passage of the blowing gas, it is deduced that this gas is not contaminated and that the blowing operation may continue. On the other hand, if the characteristics are modified by the gas, this indicates that the blowing gas is contaminated and that a sterilization of the air supply circuit is required. The sterilization of the blowing circuit is then effected without stopping the flow of sweeping air through the enclosure 1.

Gas having been removed from the containers in the mould, the mould is opened.

There are thus obtained containers R which are internally sterile owing to the sterility of the blowing air and externally sterile owing to the fact that the mould has been initially rendered sterile by the bactericide liquid sprayed in the enclosure by the systems 147, the interior and exterior sterility being moreover ensured by the fact that the extrusion of the blanks occurs at a temperature of the order of 180° C. at which no contaminating agent can survive.

When opening the mould, produced by actuating the jack 22, the half-moulds 20 and 21 move away from each other symmetrically with respect to the joint plane of the mould. The ejectors 37 which are integral with the plate 44 fixed to the wall of the enclosure remain stationary upon the withdrawal of the half-mould 20. Consequently, they ensure that the container R is maintained above the plate 63 of the transfer device. As the jaws 64 and 65 of the latter are in their pre-closing position the container thus formed is lowered onto the transfer device, hooked to the following blank P furnished by the head 17. It is separated from this blank by a cutter 157 provided in the lower part of the half-mould 20. This cutter also pinches the scrap D above the neck of the container R so that the container reaches the transfer device in the closed state.

The jaws 64 and 65 of the transfer device which are in the course of the descent of the containers in the preclosed position so as to guide the containers, close onto the two containers just coming out of the mould which are transferred to the cropping station 11. Simultaneously with this transfer, the containers which are respectively at the filling station and closing station are transferred to the following station so that at each moment of advance of the transfer device two hermetically-closed containers filled with liquid to be placked issued from the machine by way of the aperture 16.

When the machine is stopped after a given period of operation, for example after a day's work, the following operations are carried out:
washing of the filling circuit;
washing of the enclosure 1.

These operations are carried out in the same way as the corresponding operations effected before starting up the machine.

These various operations are controlled by a programmer.

Owing to the fact that the enclosure 1 is permanently swept through by a stream of sterile air, the machine described hereinbefore has over conventional aseptic packing machines the advantage of not being fluidtight which considerably simplifies its construction.

The non-fluidtightness of the packing enclosure furthermore offers the advantage of permitting an intervention from the exterior in the course of operation of the machine. Thus, it is possible to remove from the transfer device a defective container. It is sufficient for this purpose to open the door 2ª. This operation does not disturb the flow of sweeping air in the enclosure.

The machine described hereinbefore is a machine having a vertical flow of air but a packing machine of this type may be constructed having a horizontal flow or air. It is sufficient in such a machine that the various parts be disposed in such manner that the stream of sweeping air define, as in the foregoing embodiment, a non-contaminating upstream region of filling and packing and a downstream region in which there are disposed the machine parts which may be contaminating but whose contamination cannot travel in a countercurrent manner to the packing region.

Having now described my invention what I claim as new and desire to secure by Letters Patent is:

1. A packing machine for aseptically packing a product and in particular a dairy product, said machine comprising:
an enclosure defining a space,
means for producing a stream of sterile air which sweeps through said space,
an extrusion-blowing first station including extrusion-blowing means for producing internally and externally sterile containers,
a container filling second station,
a container closing third station, and
a container transfer device within said enclosure for moving containers sequentially through said first, second and third stations, said stations all being within said enclosure space and in the path of said sterile air flow, and
said means for producing said stream of sterile air comprising air inlets having filters provided above said stations and said transfer device and air outlets provided under said stations and said transfer device, said containers having orifices having upwardly towards said air inlets and wherein said moving mechanical parts of the machine which are capable of being contaminated being either located outside of the part of the stream of sterile air corresponding to at least the upstream side of the orifices of the containers relative to the direction of flow of the stream of sterile air or being protected therefrom.

2. A machine as claimed in claim 1, wherein said means for producing said stream of sterile air comprises a circuit including the enclosure, said air inlets and air outlets, and wherein said air inlets further comprise a first chamber supplying said enclosure with sterile air, said air outlets further comprising a second chamber for discharging the air from said enclosure, a fan for effecting sterile air flow, a first pipe connecting an outlet of the fan to the first chamber, a second pipe connecting an inlet of the fan to the second chamber, said filters comprising a sterilizing filter within said first chamber for filtering of air entering said first chamber under fan operation, and a pre-filter for distributing the air in the first chamber.

3. A machine as claimed in claim 1, comprising walls defining the enclosure and parts mounted to be slidable through at least one of the walls of the enclosure, sealing devices being interposed between the slidable parts which are located at least upstream of the orifices of the containers relative to the direction of flow of the sterile air and said one wall and comprising a body provided with a bore for the passage of the corresponding sliding part, a cavity opening into said bore, a tank supplying bactericide liquid, a pipe in which a pump is inserted connecting the tank to the cavity.

4. A machine as claimed in claim 1, wherein said enclosure is defined by walls and said extrusion-blowing station comprises an extrusion-blowing head, a duct which extends through a wall of the enclosure and carries said head, and a mould comprising two half-moulds which are interconnectable on a joint surface and define at least one mould cavity and which are mounted for movement transversely of the joint surface between a first closed mould position and a second open mould position, said machine further comprising posts for moving the half-moulds between the first and second positions of the half-moulds, a double-acting jack for shifting the posts, means for mounting the jack and the posts for sliding movement through said wall of the enclosure, and sealing devices interposed between said wall and the jack and posts.

5. A machine as claimed in claim 4, wherein the mould is disposed above one end of the transfer device and is equipped with ejecting devices for maintaining the container in its moulded positions when the mould is opened.

6. A machine as claimed in claim 5, wherein the ejecting devices each comprise two ejectors each in the form of a rod having a head and movably mounted in an end wall of the mould cavity of one of the half-moulds, a member for each rod and provided with two oblong grooves perpendicular to the direction of displacement of the corresponding rod, an end of said rod opposed to its head being slidably mounted in the member, a transverse pin fixed to the corresponding rod being engaged in said grooves, and elastically yieldable means secured to a wall of the enclosure carrying each of said members.

7. A machine as claimed in claim 4, wherein one of the half-moulds is provided at an end thereof opposed to the extrusion-blowing head with means for pinching a neck portion of a container and separating said container from the material of a paraison for the production of the following container in the mould, the machine further comprising a cropping station for cropping the necks of the container disposed between the producing station and the filling station.

8. A machine as claimed in claim 1, wherein the filling station comprises a series of filling devices, each filling device being constituted by a tube provided with a valve comprising a magnetic ball and a seat and means for producing a magnetic field for shifting the ball away from the seat when pouring the product from the tube.

9. A machine as claimed in claim 8, further comprising a timing device for controlling the means for producing the magnetic field, said timing device defining a cycle of a repeating flow.

10. A machine as claimed in claim 8, comprising a contact controlling the means for producing the magnetic field, said contact being connected to a balance located downstream of the space which is maintained non-contaminating.

11. A machine as claimed in claim 8, wherein detachable mechanical opening means are combined with each filling device for its sterilization, said mechanical opening means being associated with means for discharging to the exterior of the enclosure washing and sterilizing fluids for the filling device.

12. A machine as claimed in claim 11, wherein the sterile closing station for the containers closes the containers by a heat sealing of closure members taken from a continuous sterilized band, and comprises at least one device for feeding the band which comprises inside the enclosure, means for driving said closing band, means for guiding and cropping said closing band for constituting closure members, and means for fixing the closure member on the orifices of the containers by a heat welding, said means of the closing station, except for the means for fixing by heat welding, being located outside a part of the stream for sweeping air whose section is defined by the orifice of the container in the course of the closure thereof.

13. A machine as claimed in claim 4, comprising an air supply circuit for blowing air into the extrusion-blowing head, and a filter inserted in the air supply circuit for sterilizing the blowing air, a circuit for sterilizing by means of steam said air supply circuit being connected to the air supply circuit upstream of said sterilizing filter relative to the flow of the air supply.

14. A machine as claimed in claim 13, wherein the air supply circuit comprises at least a circuit for removing gas from the containers, a detector of contamination of the blowing air being connected to said gas removing circuit.

15. A machine as claimed in claim 1, wherein the transfer device comprises a horizontal plate, two jaw means disposed above the plate, means for driving the jaw means in a reciprocating movement for conveying the containers between the stations and means for moving said jaw means away from and toward each other adapted to make the jaw means occupy a closed position when the containers are conveyed by the transfer device, an open position when returning the empty transfer device, and a pre-closed position when holding the transfer device stationary, the jaw means then performing the function of a guide device for the transfer of the containers from the producing station onto the plate of the transfer device.

* * * * *